(12) United States Patent
Lim

(10) Patent No.: US 9,250,404 B2
(45) Date of Patent: Feb. 2, 2016

(54) MULTI-CHANNEL OPTICAL MODULE AND MANUFACTURING METHOD OF THE SAME

(71) Applicant: Electronics and Telecommunications Research Institute, Daejeon (KR)

(72) Inventor: Kwon-Seob Lim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 108 days.

(21) Appl. No.: 14/066,034

(22) Filed: Oct. 29, 2013

(65) Prior Publication Data

US 2014/0147085 A1    May 29, 2014

(30) Foreign Application Priority Data

Nov. 23, 2012 (KR) .................. 10-2012-0133427
Jun. 21, 2013 (KR) .................. 10-2013-0071408

(51) Int. Cl.
*G02B 6/42* (2006.01)

(52) U.S. Cl.
CPC .............. *G02B 6/428* (2013.01); *G02B 6/4249* (2013.01); *G02B 6/42* (2013.01); *Y10T 29/49128* (2015.01)

(58) Field of Classification Search
CPC .................................................. G02B 6/4249
USPC ..................................................... 385/88–94
See application file for complete search history.

(56) References Cited

U.S. PATENT DOCUMENTS

| 5,420,954 | A | * | 5/1995 | Swirhun et al. ................. 385/92 |
| 6,056,448 | A | * | 5/2000 | Sauter et al. .................... 385/92 |
| 6,238,100 | B1 | * | 5/2001 | Sasaki et al. .................... 385/59 |
| 6,792,178 | B1 | | 9/2004 | Zhou |
| 6,860,650 | B2 | * | 3/2005 | Kunkel et al. .................... 385/92 |
| 7,128,474 | B2 | * | 10/2006 | Giboney et al. ................. 385/92 |
| 7,729,581 | B2 | * | 6/2010 | Rolston et al. .................. 385/52 |
| 8,588,562 | B2 | * | 11/2013 | Zbinden et al. ................. 385/14 |
| 2003/0034438 | A1 | | 2/2003 | Sherrer et al. |

FOREIGN PATENT DOCUMENTS

| KP | 10-2005-0062257 A | 6/2005 |
| KR | 10-0627701 B1 | 9/2006 |
| KR | 10-2008-0088723 A | 10/2008 |
| KR | 10-1176950 B1 | 8/2012 |

* cited by examiner

*Primary Examiner* — Daniel Petkovsek
(74) *Attorney, Agent, or Firm* — Rabin & Berdo, P.C.

(57) ABSTRACT

Provided is a multi-channel optical module and a manufacturing method of the same. The optical module includes a base block having a cavity on one edge of the base block; a substrate arranged on the other side of the base block that faces the cavity; an integrated circuit (IC) chip mounted on the substrate; a platform arranged in the cavity; electrical contacts connected to the IC chip, wherein the electrical contacts are formed on the platform; an optical device array block arranged in the platform, wherein the optical device array block is connected to the electrical contacts; a plurality of optical fiber cores aligned with the optical device array block; and an optical fiber array block fixing the plurality of optical fiber cores, wherein the optical fiber array block is bonded to the platform and to the optical device array block and is fixed in the cavity.

16 Claims, 10 Drawing Sheets

MULTI-CHANNEL OPTICAL MODULE AND MANUFACTURING METHOD OF THE SAME

CROSS-REFERENCE TO RELATED APPLICATIONS

This U.S. non-provisional patent application claims priority under 35 U.S.C. §119 of Korean Patent Application Nos. 10-2012-0133427, filed on Nov. 23, 2012, and 10-2013-0071408, filed on Jun. 21, 2013, the entire contents of which are hereby incorporated by reference.

BACKGROUND OF THE INVENTION

The present invention disclosed herein relates to an optical communication system and a manufacturing system of the same, and more particularly, to a multi-channel optical module and a manufacturing method of the same that enable multi-channel light transmission and light reception for data transmission.

Recently, an active optical cable (AOC) such as a High-Definition Multimedia Interface (HDMI), a Display Port, a Digital Visual Interface (DVI), etc., needs four or more channels that may collect four or more wavelengths in an optical fiber so as to transmit A/V data.

Moreover, an electrical connection reveals a limit in a coupling system such as general chip to chip, board to board, board to system, and system to system and thus a demand for a multi-channel optical module for transmitting massive data so as to replace it continues to increase.

A general multi-channel optical module may include a fiber block to which many precise molding products having special shapes and guide pins are attached. In the case of the molding products, a lot of time and costs are consumed for accurate tolerance control in relevant processes, and in particular, if a single mode fiber of which a core size is about 8 um is used, there is a limitation in that the final tolerance between the fiber and an optical device needs to be controlled to be within several micrometers.

Another multi-channel optical module has a structure in which an optical device array block having a lens module that includes a mirror for converting an optical path by 90 degrees is optically coupled to optical fiber arrays. The alignment process between the optical fiber and the mirror, the mirror and the lens, or the lens and the optical device is necessarily required. Thus, the general multi-channel optical module has limitations in that the optical coupling efficiency between the final optical fiber and the optical device is not good, and many parts such as a mirror, a lens, a support tool, and a spacer for securing a space for optical coupling are used.

Another multi-channel optical module may include a fiber array block that includes guide holes and guide pins on a silicon wafer. When an optical device is passively connected to an optical fiber, a through hole needs to be formed in the correct position on a silicon wafer. The multi-channel optical module has drawbacks that it is very difficult to manufacture guide pins and a fiber array block including the guide pins and reliability is low because a crack may appear on a silicon mount due to contact with the guide pins. Moreover, the multi-channel optical module has a drawback that electrical performance decreases due to electrical crosstalk between electrical contacts of adjacent channels, which becomes more serious as a transmission rate increases.

SUMMARY OF THE INVENTION

The present invention provides a multi-channel module that has a simple structure and is easily processed, and a manufacturing method of the same.

Moreover, the present invention also provides a multi-channel optical module and a manufacturing method of the same that enable an easy packaging process and passive alignment.

Moreover, the present invention also provides a multi-channel optical module and a manufacturing method of the same that may enhance productivity.

Embodiments of the inventive concept provide multi-channel optical modules include a base block having a cavity on one edge of thereof; a substrate arranged on the other side of the base block that faces the cavity; at least one integrated circuit (IC) chip mounted on the substrate; a platform arranged in the cavity; electrical contacts connected to the IC chip and formed on the platform; at least one optical device array block arranged in the platform and connected to the electrical contacts; a plurality of optical fiber cores aligned with the optical device array block; and an optical fiber array block fixing the plurality of optical fiber cores, wherein the optical fiber array block is bonded to the platform and to the optical device array block and is fixed in the cavity.

In some embodiments, the platform may include a bottom being in contact with a sidewall of the cavity of the base block; a top being in contact with the optical fiber array block; a first slope between the top and the bottom to minimize a height and length of bonding wires between bonding pads of the IC chip on the substrate and bonding pads of the electrical contact on platform; an upper bottom on which the optical device array block is mounted from the other side of the top that faces the first slope; and a second slope between the upper bottom and the top.

In still other embodiments, the bonding pads may include first bonding pads arranged on the first slope of the platform; and second bonding pads arranged on the upper bottom of the platform.

In even other embodiments, the electrical contacts may include first bonding wires between the IC chip and the first bonding pads; transmission lines between the first bonding pads and the second bonding pads; and second bonding wires between the second bonding pads and the optical device array block.

In other embodiments, the bonding pads, the transmission lines, the first bonding wires, and the second bonding wires are a low-pass filter.

In yet other embodiments, the electrical contacts may include first bonding wires connected to the IC chip; pad transmission lines connected to the first bonding wires on the first slope and extended to the upper top of the platform on the first slope; and second bonding wires connecting the pad transmission lines to the optical device array block.

In further embodiments, the pad transmission lines may be in contact with the surfaces of the first and the second slope of the platform.

In still further embodiments, the base block may include a third slope that is adjacent to the cavity and extended from the first slope.

In even further embodiments, the substrate may be arranged on the third slope of the base block.

In yet further embodiments, the optical device array block may be in contact with a sidewall of the cavity of the base block and may be arranged between the substrate and the optical fiber array block without the platform.

In much further embodiments, the optical device array block may include optical devices that are aligned with the optical fiber cores, and may have a slope from the substrate on the base block to the optical devices in the cavity.

In still much further embodiments, the optical device array block may further include device pads that are connected to the optical devices.

In even much further embodiments, the optical devices may include a vertical cavity surface emitting laser or an edge emitting laser diode.

In yet much further embodiments, the base block may include stop bars that align the substrate on both sides of the cavity.

In yet much further embodiments, the optical fiber array block may have at least one alignment.

In yet much further embodiments, the multi-channel optical module may further include at least one guide pin that are coupled to the alignment hole.

In other embodiments of the inventive concept, methods of manufacturing a multi-channel optical module include forming electrical contacts on a platform; mounting an optical device array block on the platform; connecting first bonding wires to between the optical device array block and the electrical contacts on the platform; aligning the optical device array block with optical fiber cores and bonding the platform to a fiber array block; mounting the platform and the fiber block on the base block; fixing a substrate mounting an integrated circuit (IC) chip to the base block; and connecting second bonding wires to between the electrical contacts and the IC chip.

In some embodiments, the platform may be bonded to the optical fiber array block by using an Eutectic bonding scheme.

In other embodiments, the electrical contacts may include pad transmission lines.

In still other embodiments, the electrical contacts may include first pads coupled to the first bonding wires; second pads coupled to the second bonding wires; and transmission lines coupled to between the first pads and the second pads.

BRIEF DESCRIPTION OF THE DRAWINGS

The accompanying drawings are included to provide a further understanding of the present invention, and are incorporated in and constitute a part of this specification. The drawings illustrate exemplary embodiments of the inventive concept and, together with the description, serve to explain principles of the inventive concept. In the drawings.

DETAILED DESCRIPTION OF PREFERRED EMBODIMENTS

It should be construed that foregoing general illustrations and following detailed descriptions are exemplified and an additional explanation of claimed inventions is provided. The present invention may, therefore, be embodied in different forms and should not be construed as limited to the embodiments set forth herein. Rather, these embodiments are provided so that this disclosure will be thorough and complete, and will fully convey the scope of the present invention to those skilled in the art.

Furthermore, when it is described that any part comprises any component, it should be understood that it may further comprise other components. An embodiment described and exemplified herein includes a complementary embodiment thereof. Embodiments of the inventive concept will be described below in detail with reference to the accompanying drawings.

Figure 1:
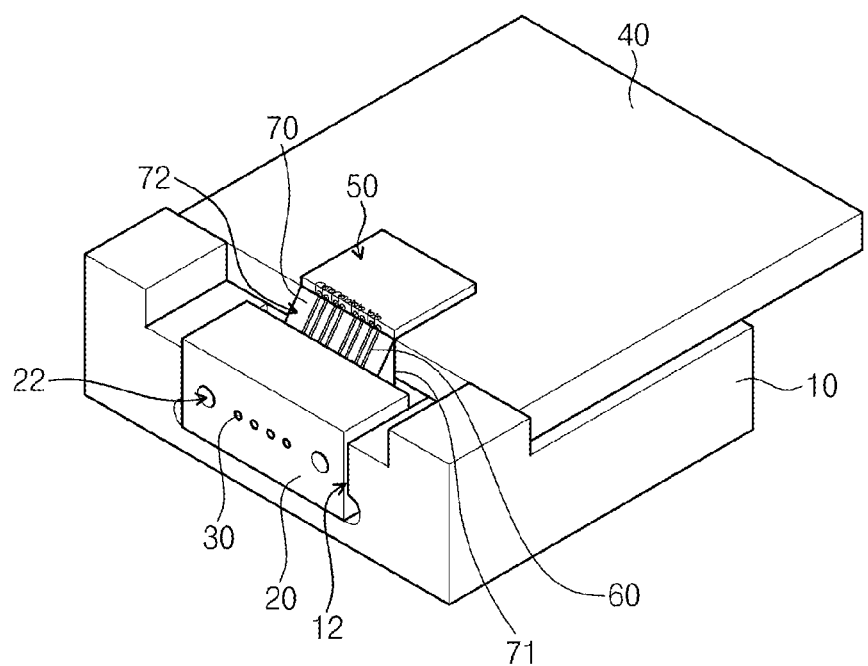
FIG. 1 is a perspective view that represents a multi-channel optical module according to an embodiment of the inventive concept.
Figure 2:
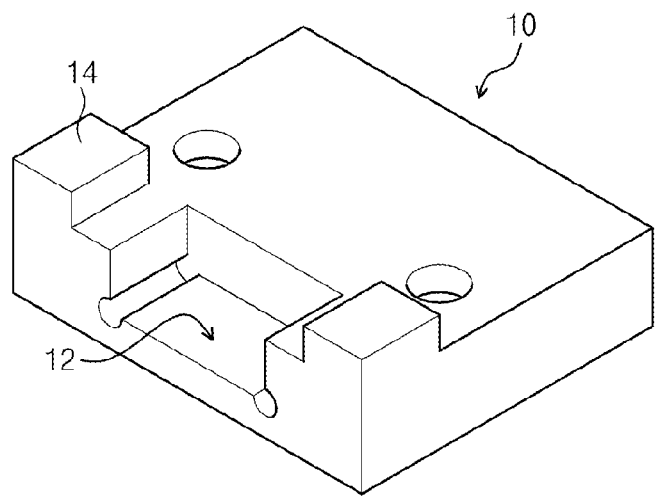
FIG. 2 is a perspective view that represents a base block of FIG. 1.

FIG. 1 is a perspective view that represents a multi-channel optical module according to an embodiment of the inventive concept. FIG. 2 is a perspective view that represents a base block 10 of FIG. 1.

Referring to FIGS. 1 and 2, a multi-channel optical module 100 according to an embodiment of the inventive concept may include a base block 10, an optical fiber array block 20, optical fibers 30, a substrate 40, at least one integrated circuit (IC) chip 50, electrical contacts 60, and a platform 70.

The base block 10 may support the optical fiber array block 20 and the substrate 40. Both edges of the base block 10 may have different heights. According to an embodiment, the optical fiber array block 20 is arranged on one top edge of the base block 10. The substrate 40 includes a printed circuit board (PCB), a flexible printed circuit board (FPCB), a silicon wafer, or a ceramic wafer. The substrate 40 is arranged on the other top edge of the base block 10. The optical fiber array block 20 may be arranged on the base block 10 to be lower than the substrate 40. The base block 10 may have a cavity 12. The optical fiber array block 20 may be inserted into the cavity 12. Moreover, the platform 70 may be mounted in the cavity. The cavity 12 may fix the optical fiber array block 20. The platform 70 may have a first slope 72. For the base block 10, stop bars 14 may be arranged on parts adjacent to both sides of the cavity 12. The stop bars 14 may align the substrate 40. The substrate 40 may be arranged to be adjacent to the cavity 12. The optical fiber array block 20 on the base block 10 and the substrate 40 may be parallel to each other on the base block 10.

The optical fiber array block 20 may fix the optical fibers 30. The optical fiber array block 20 may have alignment holes 22 that may be formed in line with the optical fibers 30. The optical fiber array block 20 may be coupled to an external optical device or an optical apparatus such as optical fiber array block, optical jumper cable, optical mux, optical demux, and so on.

The substrate 40 may mount the IC chip 50. The IC chip 50 may include an amplifier, a modulator, micro-controller or an optical device driving circuit. The IC chip 50 may be arranged on the platform 70 and the substrate 40 of the base block 10. The substrate 40 may include a flexible PCB or a rigid PCB.

One end of the transmission line 60 is connected to the IC chip 50. The other end of the transmission line 60 is connected to an electrode pad 84 of at least one optical device array block 80 that is mounted on the platform 70. The platform 70 and the optical fiber array block 20 may be bonded and fixed to each other.

The multi-channel optical module according to an embodiment of the inventive concept may passively align optical devices 82 with the optical fibers 30 by minimizing the usage of an optical part such as expensive micro lens array and mirror by changing an electrical path at a right angle (at 90°) without changing an optical path at a right angle (at 90°).

Figure 3:
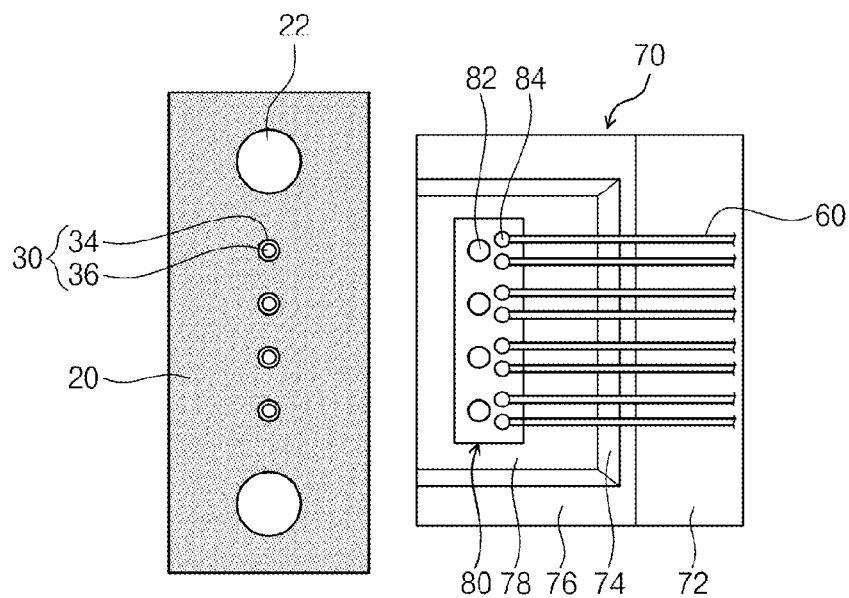
FIG. 3 is a diagram that individually represents an optical fiber array block and a platform of FIG. 1.
Figure 4:
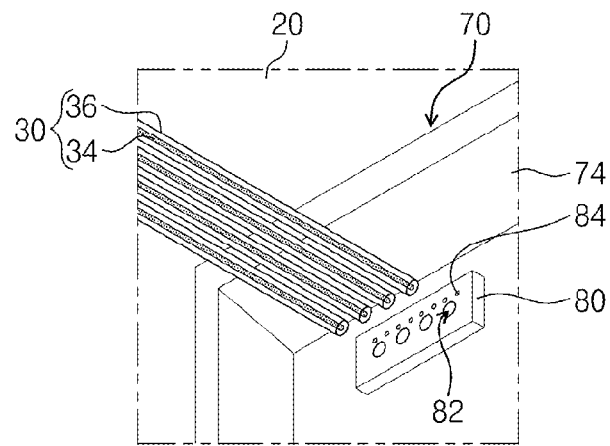
FIG. 4 is a perspective view that represents optical fibers and an optical device array block of FIG. 3 in more detail.

FIG. 3 is a diagram that individually represents the optical fiber array block 20 and the platform 70 of FIG. 1. FIG. 4 is a perspective view that represents the optical fibers 30 and the optical device array block 80 of FIG. 3 in more detail.

FIGS. 1, 3, and 4, the optical device array block 80 may be arranged between the optical device array block 20 and the platform 70. The platform 70 may fix the optical device array block 80. The platform 70 may have a bottom 71, a top 76, a first slope 72, an upper bottom 78, and a second slope 74. The bottom may be in contact with the sidewall of a cavity. The top 76 may have a height from the bottom 71 to the optical fiber array block 20. The first slope 72 is a slope between the top 76 and the bottom 71. The first slope 72 may minimize the height and the length of bonding wires between chip bonding pads 52 and bonding pads 84. The upper bottom 78 is a surface on which the optical device array block 80 is mounted from the other side of the top 76 that faces the first slope 72. The second slope 74 is the slope between the upper bottom 78 and the top 76.

The optical device array block 80 may include the optical devices 82 and device bonding pads 84. The device bonding pads 84 are electrically connected to the optical devices 82. The device bonding pads 84 may be connected to the electrical contacts 60. The optical devices 82 may include a vertical cavity surface emitting laser (VCSEL) or an edge emitting laser diode (LD). The optical fibers 30 may include a core 34 and cladding 36. The core 34 may have a diameter of about 8 micrometers to 1,000 micrometers. The optical device array block 80 may be aligned with the core 34 of the optical fiber 30. Thus, the optical device array block 80 and the optical fibers 30 may be fixed by bonding the platform 70 to the optical fiber array block 20.

Figure 5:
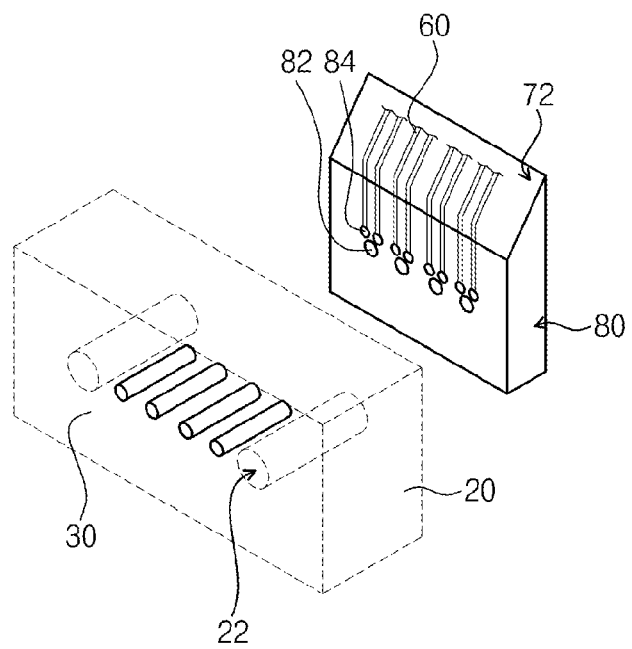
FIG. 5 is a exploding perspective view that represents an optical fiber array block and an optical device array block of FIG. 3 according to a first application of the inventive concept.

FIG. 5 is an exploding perspective view that represents the optical fiber array block 20 and the optical device array block 80 of FIG. 3 according to a first application of the inventive concept. In the first application, the platform 70 of the first embodiment is replaced with the optical device array block 80.

Referring to FIG. 5, the optical device array block 80 according to the first application of the inventive concept may have the first slope 72. The transmission line 60 may be extended along the first slope 72. Moreover, the transmission line 60 may be directly coupled to the electrode pad 84 on the optical device array block 80. The optical device array block 80 may be coupled to the optical fiber array block 20. The optical fiber 30 may be aligned with the optical device 82.

When the first slope 72 and the optical device array block 80 where the transmission line is formed on the first slope 72 are used, the present application has an advantage in that there is no need for the platform 70.

Figure 6:
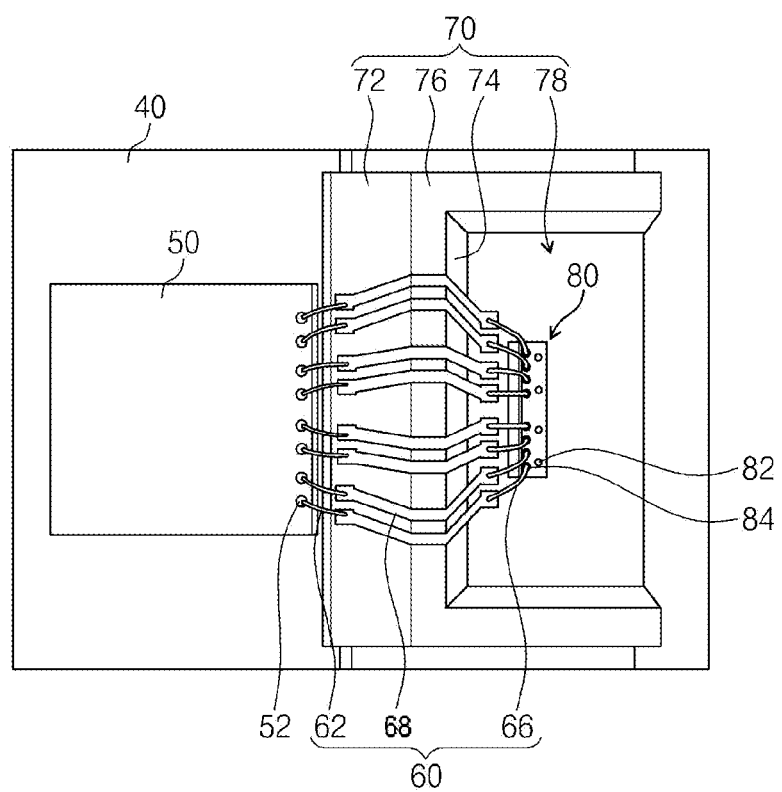
FIG. 6 represents electrical contacts between an optical device array block and an integrated circuit (IC) chip of FIGS. 3 and 4.

FIG. 6 represents the electrical contacts 60 between the optical device array block 80 and the IC chip 50 of FIGS. 3 and 4. FIG. 6 also represents the optical device array block 80, IC bonding wires 62, transmission lines 68, and second bonding wires 66. The first bonding wires 62 may be connected between chip bonding pads 52 and the transmission lines 68. The second bonding wires 66 may be connected between the device bonding pads 84 and the transmission lines 68. The transmission lines 68 may be arranged on the platform 70.

The transmission lines 68 may be extended from the first slope 72 of the platform 70 to the upper bottom 78. The transmission lines 68 may be in contact with the surface of the optical device array block 80. If the areas of the transmission lines 68 increase, their parasitic capacitances may increase. The transmission lines 68 may have the same function as those of bonding pads 90 to be described below. Although not shown, the bonding pads 90 may be connected to both ends of the transmission lines 68 if the width of the transmission lines 68 is narrow.

Figure 7:
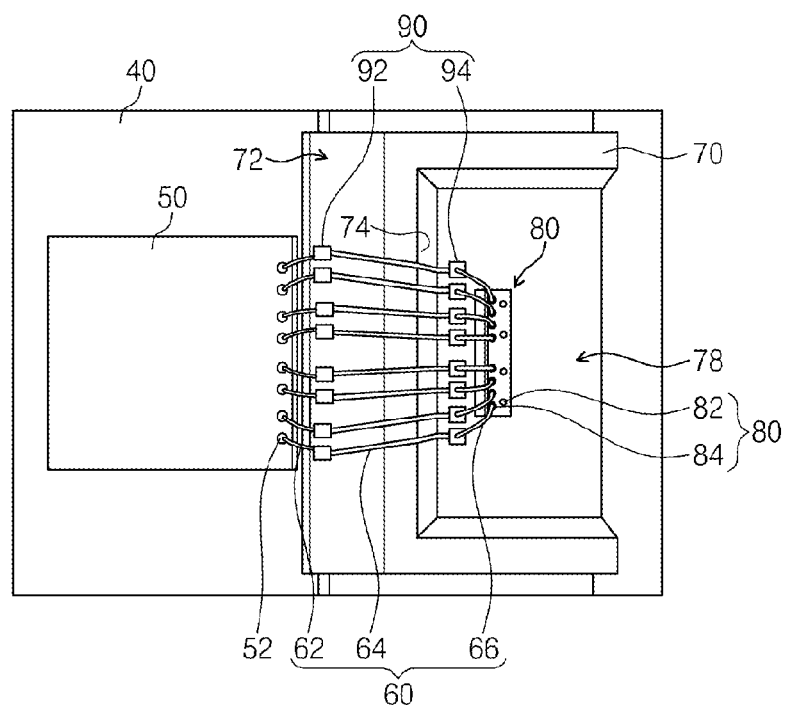
FIG. 7 is a plane view that represents bonding wires and bonding pads between an optical device array block and an IC chip of FIGS. 3 and 4.

FIG. 7 is a plane view that represents the electrical contacts 60 and the bonding pads 90 between the optical device array block 80 and the IC chip 50 of FIGS. 3 and 4.

Referring to FIG. 7, the bonding pads 90 may be arranged on the platform 70. The bonding pads 90 may include first bonding pads 92 and second bonding pads 94. The first bonding pads 92 may be arranged on the first slope 72 of the platform 70. The second bonding pads 94 may be arranged on the upper bottom 78 of the platform 70. The electrical contacts 60 may include first bonding wires 62, transmission lines 64, and second bonding wires 66. The first bonding wires 62 may be connected to between the IC chip 50 and the first bonding pads 92. The transmission lines 64 may be connected to between the first bonding pads 92 and the second bonding pads 94. The second bonding wires 66 may be connected to between the second bonding pads 94 and the optical device array block 80. The IC chip 50 and the optical device array block 80 may have the chip bonding pads 52 and the device bonding pads 84, respectively. The chip bonding pads 52 and the device bonding pads 84 may be connected to the first bonding wires 62 and the second bonding wires 66. Detailed descriptions of the chip bonding pads 52 and the device bonding pads 84 will be not provided. On the other hand, a modulation signal may be transmitted to between the optical device array block 80 and the IC chip 50. The modulation signal may cause crosstalk between adjacent transmission lines 64. The crosstalk may increase or decrease according to the relation between the capacitance and inductance of the transmission lines 64. It may have much to do with the area of the width of the transmission lines 64. If the width of the transmission lines 64 increases, capacitance may increase and inductance may decrease. On the contrary, if the width of the transmission lines 64 decreases, inductance may increase and capacitance may decrease. As shown in FIG. 7, if in order to minimize crosstalk, the distance, interval, size, or width of each of the bonding wires 60 and bonding pads 90 is properly adjusted, the multi-channel optical module according to an embodiment of the inventive concept may implement the characteristics of a low-pass filter having any cut-off frequency without adding a separate electronic device such as a capacitor and an inductor. In other word, the bonding pads 90, the transmission lines 64, the first bonding wires 62, and the second bonding wires 66 may be a low-pass filter.

The characteristics of the low-pass filter may be determined according to the arrangement structure of the transmission lines 64 and bonding pads 90 on the platform 70.

Figure 8:
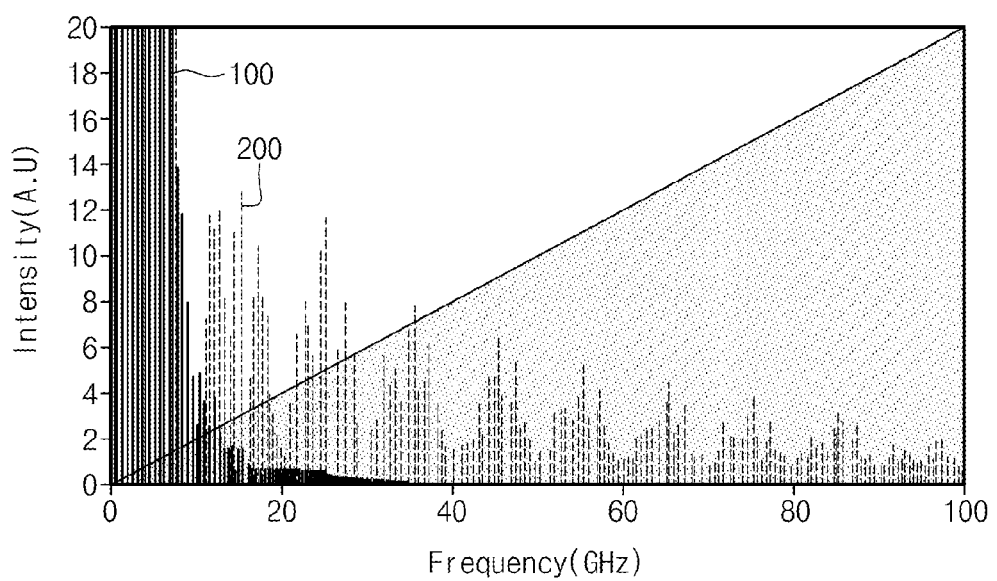
FIG. 8 is a graph that compares high frequency removed characteristics in a platform structure according to an embodiment of the inventive concept with those in a general platform structure.

FIG. 8 shows high-frequency transfer characteristics for each of the electrical contacts 60 of FIG. 6 and the electrical contacts 60 having the characteristics of the low-pass filter of FIG. 7. The transmission line 100 having the characteristics of the low-pass filter has an advantage in that the electrical crosstalk between adjacent electrical contacts 60 may effectively decrease by removing the signals of a high frequency region. The platform structure 100 according to an embodiment of the inventive concept may remove high frequency components from modulation signals equal to or higher than 100 GHz. A general platform structure 200 may not remove high frequency components that periodically appear in modulation signals lower than or equal to about 100 GHz. The graph of FIG. 8 represents the intensity of spectrum that is detected at the output of the platform structure if a modulation signal of 10 Gbps is applied to the input of the platform structure.

Figure 9:
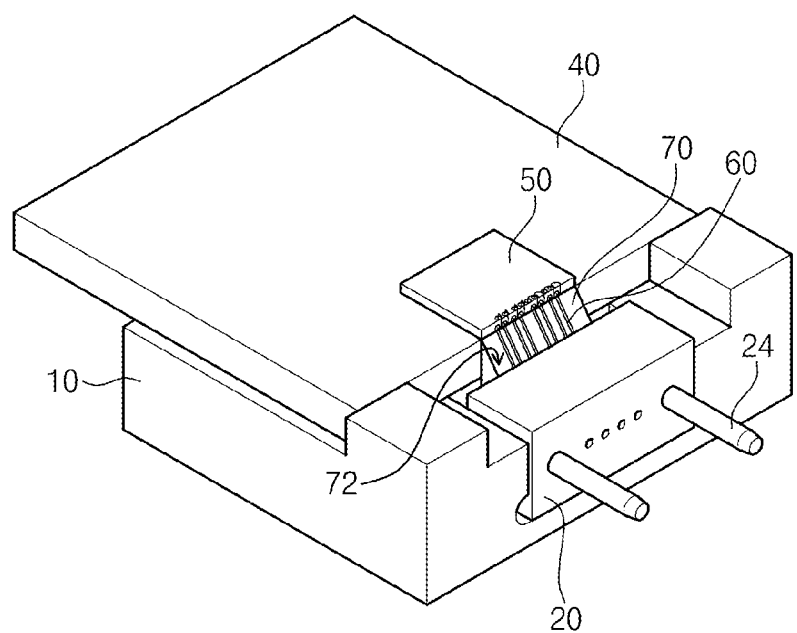
FIG. 9 is a perspective view that represents a multi-channel optical module according to a second application of the inventive concept.

FIG. 9 is a perspective view that represents a multi-channel optical module according to a second application of the inventive concept. The second application has at least one guide pin 24 on the optical fiber array block 20 according to an embodiment.

Referring to FIG. 9, the multi-channel optical module according to the second application of the inventive concept may include at least one guide pin 24 that are coupled to the alignment hole 22 of the optical fiber array block 20. The guide pin 24 may align the multi-channel optical module with a separate module that is coupled to the optical fiber array block 20.

Figure 10:
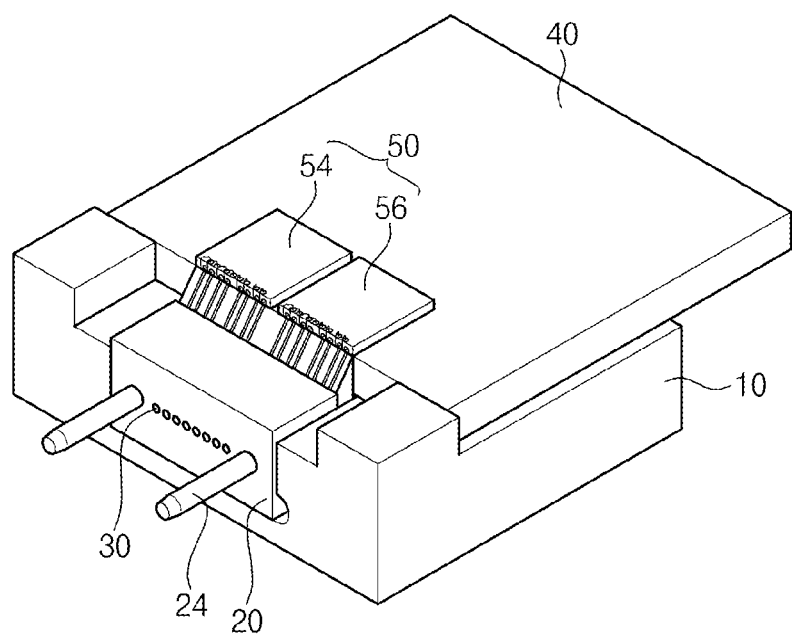
FIG. 10 is a perspective view that represents a multi-channel optical module according to a third application of the inventive concept.

FIG. 10 is a perspective view that represents a multi-channel optical module according to a third application of the inventive concept. In the third application, a transmission chip 54 and a reception chip 56 are mounted on the substrate 40 of the first application for bidirectional transmission and reception.

Referring to FIG. 10, the multi-channel optical module according to the third application of the inventive concept may include the transmission chip 54 and the reception chip 56 that are mounted on the substrate 40. For example, each of the transmission chip 54 and the reception chip 56 may consist of four channels. The inventive concept is not limited thereto and each of the transmission chip 54 and the reception chip 56 may consist of at least one channel. The transmission chip 54 may be a laser diode driver. The reception chip 56 may be an amplifying circuit.

Figure 11:
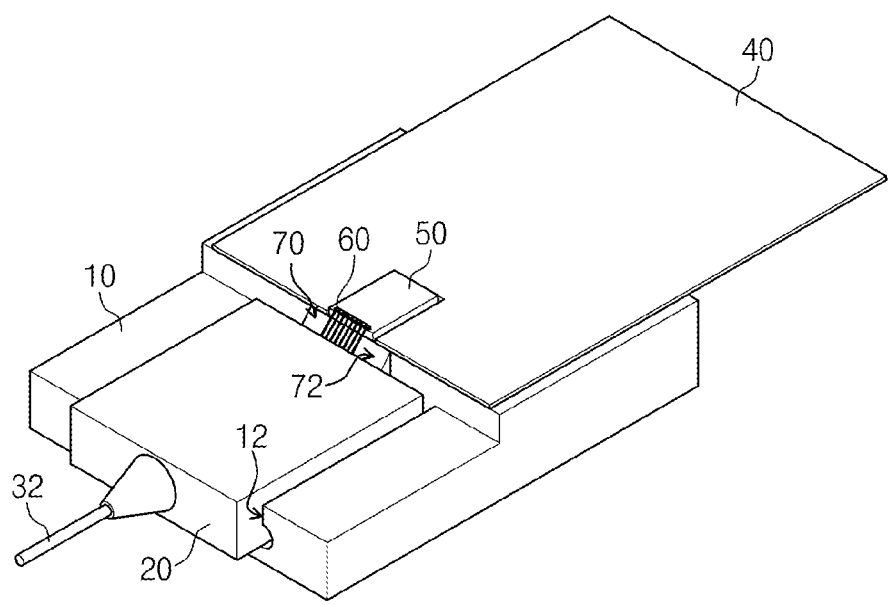
FIG. 11 is a perspective view that represents a multi-channel optical module according to a fourth application of the inventive concept.

FIG. 11 is a perspective view that represents a multi-channel optical module according to a fourth application of the inventive concept. In the fourth application, the optical fibers 30 of an embodiment are replaced with an optical fiber bundle 32 that are pigtail-coupled.

Referring to FIG. 11, the multi-channel optical module according to the fourth application may include a pigtail-type optical fiber bundle 32. The optical fiber bundle 32 is formed by coupling the optical fibers 30 of an embodiment into one. The optical fibers 30 may be coupled in the optical fiber array block 20.

Figure 12:
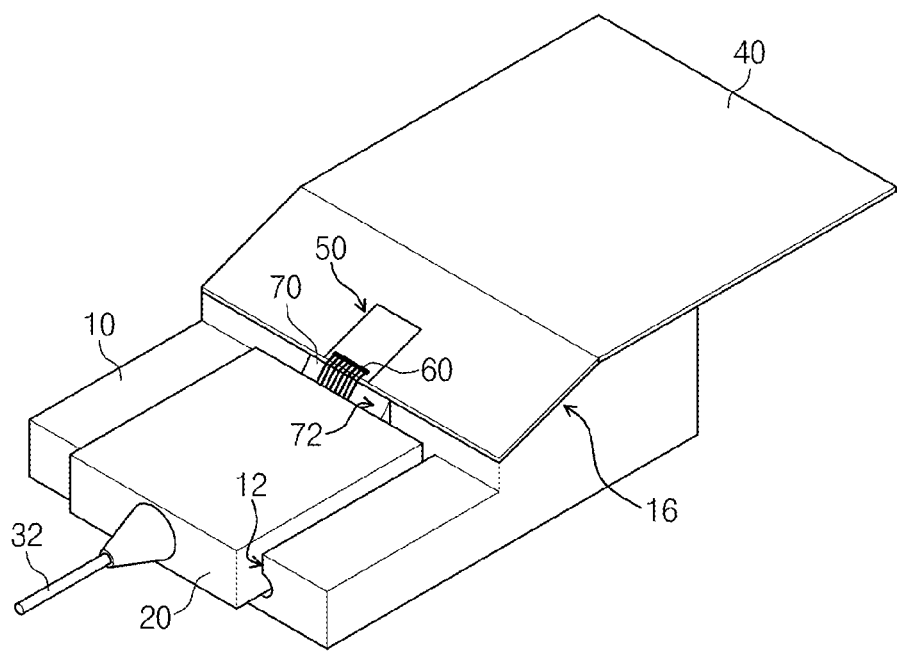
FIG. 12 is a perspective view that represents a multi-channel optical module according to a fifth application of the inventive concept.

FIG. 12 is a perspective view that represents a multi-channel optical module according to a fifth application of the inventive concept. In the fifth application, a third slope 16 is formed on the base block 10 of the fourth application.

Referring to FIG. 12, the multi-channel optical module according to the fifth application of the inventive concept may include the base block 10 having the third slope 16 that is adjacent to the platform 70. The third slope 16 may be extended the first slope 72 of the platform 70 at the same angle as that of the first slope 72 of the platform 70. The substrate 40 and the IC chip 50 may be arranged on the third slope 16. The third slope 16 may minimize the length of the bonding wire between the substrate 40 and the platform 70.

Methods of manufacturing the multi-channel optical modules according to the first to fifth applications of the inventive concept will be described below.

Figure 13:
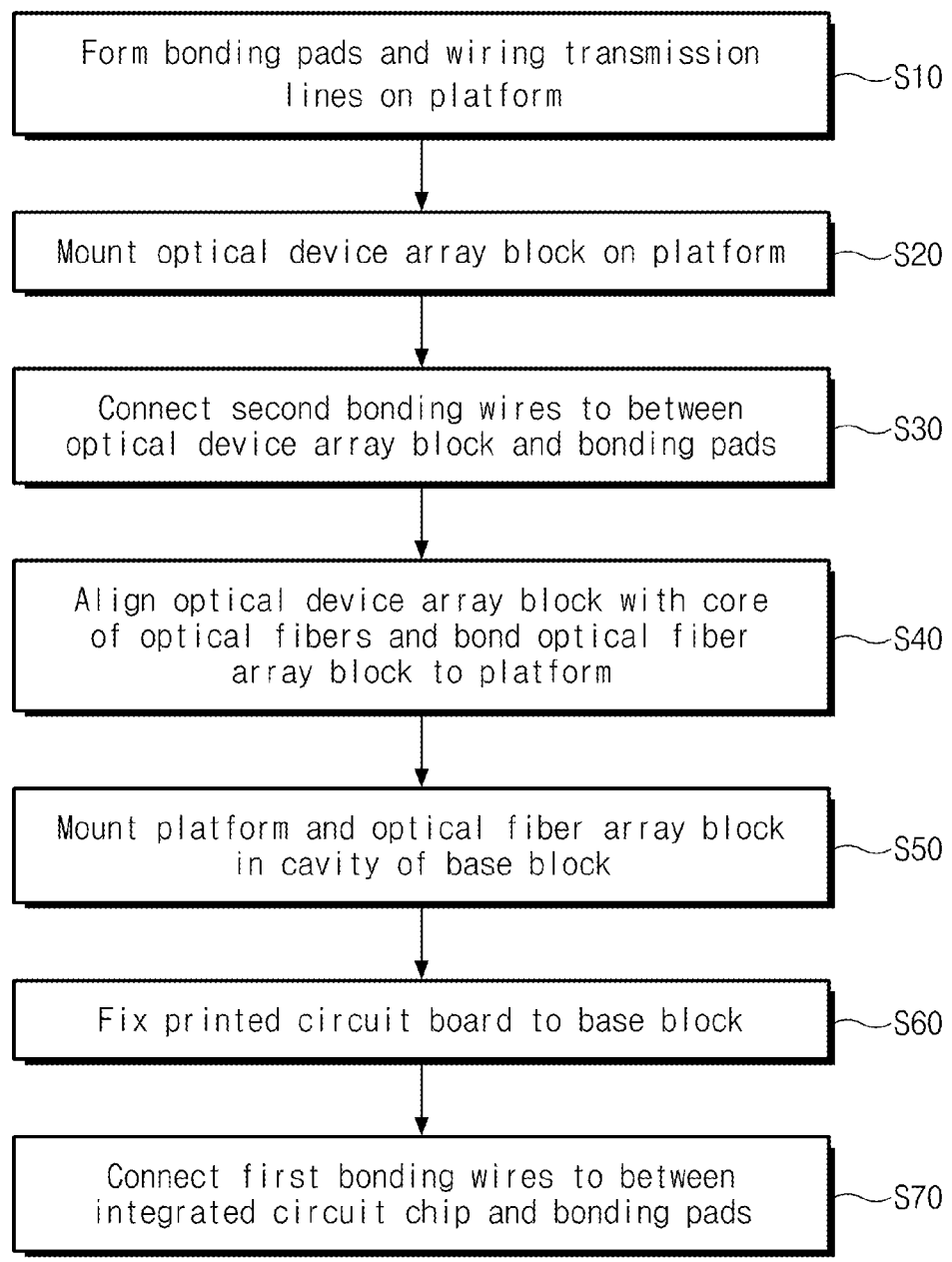
FIG. 13 is a flowchart for explaining a method of manufacturing a multi-channel optical module according to an embodiment of the inventive concept.

FIG. 13 is a flowchart for explaining a method of manufacturing a multi-channel optical module according to an embodiment of the inventive concept.

Referring to FIGS. 1, 3, 7, and 13, the bonding pads 90 and the transmission lines 64 are formed on the platform 70 in step S10. The bonding pads 90 may include the first bonding pads on the first slope 72 and include the second bonding pads 94 on the upper bottom 78.

Next, the optical device array block 80 is mounted on the platform in step S20. The optical device array block 80 may be mounted on the upper bottom 78 of the platform 70. Although not shown, the optical device array blocks 80 may be aligned according to the alignment marks on the upper bottom 78 of the platform 70.

Next, the second bonding wires 66 are connected to between the optical device array block 80 and the second bonding pads 94 in step S30. The second bonding wires 66 may be respectively connected to the optical device array block 80 by a wire bonding apparatus.

Next, the active areas of optical device array block 80 is aligned with the cores 34 of the optical fibers 30 and the platform 70 is bonded to the optical fiber array block 20 in step S40. The optical device array block 80 and the core 34 may be passively aligned by the flip chip bonding or die bonding apparatus. The core 34 may be aligned with the active area 82 of the optical device array block 80. The platform 70 may be bonded to the optical fiber array block 20 by using an Eutectic bonding scheme. The Eutectic bonding scheme may use a metal deposit or solder. Moreover, the platform 70 may be bonded to the optical fiber array block 20 by using an adhesive.

Subsequently, the platform 70 and the optical fiber array block 20 are mounted in the cavity of the base block 10 in step S50. The platform 70 and the optical fiber array block 20 may be bonded in the cavity by using an adhesive.

In addition, the substrate 40 is fixed to the other side of the base block 10 in step S60. The substrate 40 and the base block 10 may be fixed by using the adhesive or using the screw.

Lastly, the first bonding wires 62 are connected to between the IC chip 50 and the first bonding pads 92 on the platform 70 in step S70. The second bonding wires 62 may be connected to the IC chip 50 and the first bonding pads 92 by a wire bonding apparatus.

The multi-channel optical module according to an embodiment of the inventive concept may include a base block, an optical fiber array block, optical fibers, a substrate, an IC chip, bonding wires, a platform, and an optical device array block. The optical fiber array block may fix the optical fibers. The platform may fix the optical device array block. The optical fiber array block and the optical device array block may be passively aligned by a flip chip bonding or die bonding apparatus. The optical fiber array block and the platform may be bonded. The bonding wires may connect the optical device array block to the IC chip. Bonding pads may be arranged on the platform. The bonding pads may be connected to the bonding wires. If the distance, interval, width, or size of each of the bonding pads, transmission lines and the bonding wires is properly adjusted, it is possible to decrease electrical crosstalk by implementing the characteristics of a lass-pass filter without adding a separate optical or electrical device.

Thus, the multi-channel optical module according to the embodiment of the inventive concept may enable mass production by using a passive optical alignment method and a surface mounting technology. Moreover, the inventive concept has advantages in that a structure is simple because an expensive optical part such as a micro lens array and a mirror is not used, and cost effectiveness is possible because the number of parts decreases.

It will be understood by those skilled in the art that various changes in form and details may be made therein without departing from the spirit and scope of the invention as defined by the appended claims. Therefore, the disclosed methods should be considered in descriptive sense only and not for purposes of limitation. The scope of the invention is defined not by the detailed description of the invention but by the appended claims, and all differences within the scope will be construed as being included in the inventive concept.

What is claimed is:

1. A multi-channel optical module comprising:
   a base block having a cavity on one edge thereof;
   a substrate arranged on the other side of the base block that faces the cavity;
   at least one integrated circuit (IC) chip mounted on the substrate;
   a platform arranged in the cavity;
   electrical contacts connected to the IC chip and formed on the platform;
   at least one optical device array block arranged in the platform and connected to the electrical contacts of the platform;
   a plurality of optical fiber cores aligned with the optical device array block; and
   an optical fiber array block fixing the plurality of optical fiber cores, wherein the optical fiber array block is bonded to the platform and to the optical device array block and is fixed in the cavity of the base block.

2. The multi-channel optical module of claim 1, wherein the platform comprises:
   a bottom being in contact with a sidewall of the cavity of the base block;
   a top being in contact with the optical fiber array block;
   a first slope between the top and the bottom to minimize a height and a length of bonding wires between bonding pads of the IC chip on the substrate and bonding pads of the electrical contact on platform;
   an upper bottom on which the optical device array block is mounted from the other side of the top that faces the first slope; and
   a second slope between the upper bottom and the top.

3. The multi-channel optical module of claim 2, wherein the bonding pads comprise:
   first bonding pads arranged on the first slope of the platform; and
   second bonding pads arranged on the upper bottom of the platform.

4. The multi-channel optical module of claim 3, wherein the electrical contacts comprise:
   first bonding wires between the IC chip and the first bonding pads;
   transmission lines between the first bonding pads and the second bonding pads; and
   second bonding wires between the second bonding pads and the optical device array block.

5. The multi-channel optical module of claim 4, wherein the bonding pads, the transmission lines, the first bonding wires, and the second bonding wires are a low-pass filter.

6. The multi-channel optical module of claim 2, wherein the electrical contacts comprise:
   first bonding wires connected to the IC chip;
   pad transmission lines connected to the first bonding wires on the first slope and extended to the upper top of the platform on the first slope; and
   second bonding wires connecting the pad transmission lines to the optical device array block.

7. The multi-channel optical module of claim 6, wherein the pad transmission lines are in contact with the surfaces of the first and the second slope of the platform.

8. The multi-channel optical module of claim 2, wherein the base block comprises a third slope that is adjacent to the cavity and extended from the first slope.

9. The multi-channel optical module of claim 8, wherein the substrate is arranged on the third slope of the base block.

10. The multi-channel optical module of claim 1, wherein the optical device array block is in contact with a sidewall of the cavity of the base block and is arranged between the substrate and the optical fiber array block without the platform.

11. The multi-channel optical module of claim 10, wherein the optical device array block comprises optical devices that are aligned with the optical fiber cores and has a slope from the substrate to the optical devices.

12. The multi-channel optical module of claim 11, wherein the optical device array block further comprises device pads that are connected to the optical devices.

13. The multi-channel optical module of claim 1, wherein the optical devices comprise a vertical cavity surface emitting laser or an edge emitting laser diode.

14. The multi-channel optical module of claim 1, wherein the base block comprises stop bars that align the substrate on both sides of the cavity.

15. The multi-channel optical module of claim 1, wherein the optical fiber array block has at least one alignment hole.

16. The multi-channel optical module of claim 15, further comprising at least one guide pin that is coupled to the least one alignment hole.

* * * * *